(12) United States Patent
Razgani et al.

(10) Patent No.: US 11,839,843 B2
(45) Date of Patent: Dec. 12, 2023

(54) INTERMEDIATE COVER OF A FILTER HOUSING OF A FILTER FOR PURIFYING LIQUID FLUIDS AND FILTER INSERT, FILTER AND USE

(71) Applicant: MANN+HUMMEL GmbH, Ludwigsburg (DE)

(72) Inventors: Idriss Razgani, Tangier (MA); Christian Vogt, Marbach (DE); Jan Svoboda, Cihalín (CZ); Guenter Jokschas, Murrhardt (DE); Pius Trautmann, Stuttgart (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 411 days.

(21) Appl. No.: 16/950,674

(22) Filed: Nov. 17, 2020

(65) Prior Publication Data

US 2021/0069620 A1    Mar. 11, 2021

Related U.S. Application Data

(63) Continuation of application No. PCT/EP2019/062517, filed on May 15, 2019.

(30) Foreign Application Priority Data

May 18, 2018 (DE) .......................... 102018004158.2

(51) Int. Cl.
   *B01D 35/30* (2006.01)
   *B01D 36/04* (2006.01)
   *B01D 35/00* (2006.01)

(52) U.S. Cl.
   CPC ........... *B01D 35/30* (2013.01); *B01D 35/005* (2013.01); *B01D 36/045* (2013.01);
   (Continued)

(58) Field of Classification Search
   CPC .... B01D 35/30; B01D 35/005; B01D 36/045; B01D 2201/0415; B01D 2201/304;
   (Continued)

(56) References Cited

U.S. PATENT DOCUMENTS

| 4,640,772 A | 2/1987 | Graham | |
| 2007/0232475 A1* | 10/2007 | Baumann | ............... B01D 35/30 494/36 |
| 2012/0267293 A1* | 10/2012 | Ardes | .................. B01D 35/147 210/418 |

FOREIGN PATENT DOCUMENTS

| DE | 10124463 A1 | 1/2003 |
| FR | 2900350 A1 | 11/2007 |

\* cited by examiner

*Primary Examiner* — Madeline Gonzalez (57) ABSTRACT

An intermediate cover of a filter housing of a filter for purifying liquids can be mounted in the filter housing for separating a filter receiving space for a filter insert from a centrifuge receiving space for a centrifuge separator by a rotary and/or insertion movement relative to an imaginary axis. The intermediate cover is provided with a portion of at least one clean fluid channel forming a fluidic connection between a clean fluid side of the filter insert and a fluid outlet of the filter housing for a purified clean fluid. The filter insert has a connecting device arranged at an axial end face and connectable to the intermediate cover. An outlet opening for purified clean fluid is arranged at the axial end face and corresponds with an inlet opening of the clean fluid channel of the intermediate cover. The outlet opening at least partially forms the connecting device.

16 Claims, 6 Drawing Sheets

(52) U.S. Cl.
CPC .............. *B01D 2201/0415* (2013.01); *B01D 2201/304* (2013.01); *B01D 2201/307* (2013.01)

(58) Field of Classification Search
CPC ........ B01D 2201/307; B01D 2201/295; B01D 2201/298; B01D 2201/4038; B01D 2201/4084; B01D 29/21; B01D 29/54; B01D 35/147; B01D 35/153; B01D 35/16; B04B 5/005; B04B 7/02; F01M 1/10; F01M 11/03; F01M 2001/1035; F02M 37/32
USPC .... 210/295, 416.5, DIG. 13, DIG. 17, 360.1, 210/360.2, 361, 308, 309, 380.1, 781, 210/304–306, 262, 415, 455, 512.1, 366, 210/248, 232; 494/36, 64, 43, 65, 67, 83, 494/84, 60
See application file for complete search history.

INTERMEDIATE COVER OF A FILTER HOUSING OF A FILTER FOR PURIFYING LIQUID FLUIDS AND FILTER INSERT, FILTER AND USE

CROSS-REFERENCE TO RELATED APPLICATIONS

This application is a continuation application of international application No. PCT/EP2019/062517 having an international filing date of 15 May 2019 and designating the United States, the international application claiming a priority date of 18 May 2018 based on prior filed German patent application No. 10 2018 004 158.2, the entire contents of the aforesaid international application and the aforesaid German patent application being incorporated herein by reference.

BACKGROUND OF THE INVENTION

The invention concerns an intermediate cover of a filter housing of a filter for purifying liquid fluids,
   wherein the intermediate cover for separation of a filter receiving space for at least one filter insert from a centrifuge receiving space for at least one centrifuge separator is installed or can be installed in an interior of a filter housing by means of a rotary and/or insertion movement in respect to an imaginary axis,
   and wherein the intermediate cover comprises preferably at least one raw fluid channel which is arranged or can be arranged as a fluidic connection between at least one fluid inlet of the filter housing for raw fluid to be purified and at least one centrifuge inlet of the at least one centrifuge separator.

Moreover, the invention concerns a filter insert for exchangeable installation in a filter housing of a filter for purifying liquid fluids,
   wherein the filter insert comprises at least one connecting device at an axial end face, axial in respect to an imaginary axis, for connecting with an intermediate cover which is arranged or can be arranged in the interior of the filter housing for separation of a filter receiving space for the filter insert from a centrifuge receiving space for at least one centrifuge separator,
   and wherein the filter insert can be installed in the filter housing or can be removed therefrom by means of a rotary and/or insertion movement in respect to the axis.

Moreover, the invention concerns a filter comprising a filter housing, an exchangeable filter and an intermediate cover as well as the use of the filter insert and/or of the intermediate cover in a filter housing.

U.S. Pat. No. 4,640,772 A discloses an oil filter with a filter and a centrifuge wherein the filter, embodied in the form of a screw-on exchangeable filter, is screwed to a mounting flange and the centrifuge rotor is also mounted at the flange and is surrounded by a cover.

DE 103 44 664 A1 discloses a device for separation of contaminants from lubricant oil of an internal combustion engine in particular in a motor vehicle. The device comprises a filter insert, a centrifuge, a feed system, a discharge system, and an intermediate wall. The filter insert and the centrifuge are arranged in alignment above each other in a housing which can be closed by at least one cover. When the housing is open, the filter insert and the centrifuge can be removed therefrom. The intermediate wall is arranged between filter insert and centrifuge, is removable from the housing when it is open, comprises devices for holding or supporting or centering the filter insert and/or the centrifuge, and contains a connecting channel which is connected at the outlet side with a centrifuge inlet. In order to improve the performance of the device, the connecting channel is connected at the inlet side upstream of the filter insert to the feed system.

The object of the invention resides in designing an intermediate cover and a filter insert of the aforementioned kind in which, as a whole, the expenditure for clean fluid lines on the part of the filter housing can be reduced.

SUMMARY OF THE INVENTION

This object is solved according to the invention for the intermediate cover in that the intermediate cover forms at least partially a clean fluid channel which is arranged or can be arranged as a fluidic connection between a clean fluid side of the at least one filter insert and at least one fluid outlet of the filter housing for purified clean fluid.

According to the invention, a part of the clean fluid channel is realized by means of the intermediate cover with which a connection of the clean fluid side of the at least one filter insert with the fluid outlet of the filter housing is realized. In contrast thereto, in the device known from the prior art a separate discharge system in the filter housing is required which connects the fluid outlet on the part of the centrifuge, which is located at the top at the filter housing, as well as the fluid outlet on the part of the filter insert, which is located at the bottom at the filter housing, to the fluid outlet of the filter housing. This discharge system known from the prior art is therefore correspondingly complex in regard to manufacture as well as to the required installation space. By means of the invention, it is now possible that the fluid outlet of the at least one centrifuge separator as well as the fluid outlet of the at least one filter insert can be arranged in the region of the intermediate cover. In this way, complex discharge systems in the filter housing can be dispensed with.

The intermediate cover forms the at least one clean fluid channel at least partially. Advantageously, a corresponding section of the clean fluid channel can be realized in the intermediate cover. This section of the at least one clean fluid channel can connect the preferably central fluid outlet on the part of the at least one filter insert with the fluid outlet on the part of the filter housing.

As an alternative, only a portion of the wall of a section of the at least one clean fluid channel can be realized with the intermediate cover. A supplemental part of the wall of the at least one clean fluid channel can be formed at the filter insert, in particular with an end body, in particular an end disc, of the at least one filter insert. In this way, when connecting the intermediate cover with the filter insert, the corresponding section of the clean fluid channel can be completed.

Advantageously, the at least one filter insert, the intermediate cover, and the at least one centrifuge separator can be arranged axially with respect to the axis. In this way, these components can be mounted on top of each other. Moreover, these components can be connected with each other and/or arranged in the filter housing by means of rotary and/or insertion movement in particular about the axis.

Advantageously, the intermediate cover and the at least one filter insert can be connected in particular detachably to each other by means of the rotary and/or insertion connection. As an alternative or in addition, the intermediate cover and the at least one centrifuge separator can be connected in particular detachably by means of a rotary and/or insertion connection.

A rotary and/or insertion connection is a connection which can be realized and canceled by means of a rotary and/or insertion movement. This can be a screw connection, a bayonet closure type connection, a locking connection, a clip connection, a snap connection and/or a plug-in connection or the like. A screw connection is realized by a combined rotary and insertion movement whereby an insertion movement is caused due to the rotation of the participating components relative to each other.

Advantageously, the at least one filter insert and the intermediate cover can be arranged axially in an interior of a housing cup of the filter housing.

Advantageously, at least one centrifuge separator can be arranged in a cup-shaped housing cover of the filter housing. The housing cover can be connected by means of a rotary and/or insertion connection with the housing cup.

Advantageously, the at least one filter insert may be a so-called hollow filter element.

A hollow filter element is characterized in that it comprises at least one element interior which is surrounded by filter medium. The filter medium can be flowed through by the fluid to be purified from the exterior to the interior toward the element interior, or in reverse. The element interior comprises a fluid passage to the exterior through which, depending on the flow direction, the purified fluid exits from the element interior or the fluid to be purified is supplied thereto. The filter medium can surround the element interior circumferentially in respect to an element axis. At least at one axial end face, axial in respect to the element axis, the filter medium can be connected with an end body, in particular an end disc. At least one end body can comprise at least one through opening for the element interior.

The hollow filter element can be advantageously a so-called round filter element with a round cross section, an oval round filter element with an oval cross section, a flat-oval round filter element with a flattened oval cross section, a conical round filter element in which the round cross section tapers in axial direction in respect to a main axis, a conical-oval round filter element in which the oval cross section tapers in axial direction at least in the direction of a transverse axis, a conical flat-oval round filter element in which the flat-oval cross section tapers in axial direction at least in the direction of a transverse axis, or a hollow filter element with a different, in particular an angular, cross section and/or a different axial cross-sectional course in the direction of an element axis.

The filter element can advantageously be closed or open circumferentially in respect to the element axis. The filter element can be folded in particular in a star shape, preferably zigzag-shaped or corrugated, or curved. The filter medium can also not be folded or not be curved.

The filter can advantageously be a part of an internal combustion engine. The filter can be used for cleaning motor oil, fuel, hydraulic liquid, cooling liquid, urea-water solution, water or other liquid fluids. The filter can also be used outside of automotive technology, in particular in industrial motors.

The invention can be used in motor vehicles, in particular passenger cars, trucks, buses, agricultural and/or construction vehicles, construction/agricultural machines, compressors, industrial motors or other devices, in particular with internal combustion engines. The invention can be used in land vehicles, watercraft, and/or aircraft.

In an advantageous embodiment, the intermediate cover can comprise on its axial end face, axial in respect to the axis and facing the at least one filter insert, at least one inlet opening for the at least one clean fluid channel which corresponds, when the intermediate cover is mounted, with at least one outlet opening for clean fluid of the at least one filter insert. In this manner, a direct connection between the clean fluid side of the at least one filter insert and the at least one clean fluid channel in the intermediate cover can be realized in a space-saving way.

In a further advantageous embodiment, the intermediate cover can comprise on at least one circumferential side, extending circumferentially in respect to the axis, at least one outlet opening of the at least one clean fluid channel which, when the intermediate cover is mounted, corresponds with at least one fluid outlet of the filter housing for clean fluid. In this manner, the clean fluid can drain laterally from the at least one intermediate cover. In this way, the space requirement in axial direction in respect to the axis can be reduced. Moreover, corresponding connecting channels and bypasses for the clean fluid in the filter housing can be dispensed with in this way.

In a further advantageous embodiment, at least one outlet opening of the at least one clean fluid channel can extend across the entire outer circumference of the intermediate cover. In this way, the at least one outlet opening in any rotational orientation in respect to the filter housing can be connected with the at least one fluid outlet of the filter housing. In this manner, mounting of the intermediate cover can be simplified.

In a further advantageous embodiment, the at least one clean fluid channel can be realized as an intermediate space axially in respect to the axis between a filter-side separation section and a centrifuge-side separation section of the intermediate cover. In this way, the at least one clean fluid channel can be integrated in a space-saving way in the interior of the intermediate cover. The at least one clean fluid channel in this context can be separated at one side with the filter-side separation section from the centrifuge receiving space and on the other side with the filter-side separation section from the filter receiving space.

Advantageously, the filter-side separation section and/or the centrifuge-side separation section can be realized as disc sections. In this manner, the corresponding separation section can be realized in a space-saving manner in axial direction in respect to the axis. As a whole, an axial height of the filter and filter housing can be reduced in this way.

In a further advantageous embodiment, at least one raw fluid channel in the intermediate cover can connect a filter-side end face of the intermediate cover with a centrifuge-side end face of the intermediate cover. In this way, a correspondingly short connection can be realized between the end faces of the intermediate cover. In this way, a component expenditure can be reduced. In case that a housing variant without centrifuge is present, an intermediate cover with such a raw fluid channel as well as an intermediate cover without such a raw fluid channel can be used therein in the here described arrangement.

The at least one raw fluid channel can extend in this context in respect to its axis approximately parallel to the axis of the intermediate cover.

In a further advantageous embodiment, at least one raw fluid channel can extend axially, in respect to the axis, through an intermediate space that at least partially forms the clean fluid channel between a filter-side separation section and a centrifuge-side separation section of the intermediate cover, wherein the at least one raw fluid channel in the intermediate space is surrounded by at least one channel wall. In this manner, the at least one raw fluid channel as well as the at least one clean fluid channel can be realized in a space-saving way within the same space region. With the at least one channel wall, the at least one raw fluid channel is separated from the at least one clean fluid channel in a simple way. Moreover, the at least one channel wall can serve as a spacer and/or mechanical connection between the filter-side separation section and the centrifuge-side separation section.

In a further advantageous embodiment, a plurality of raw fluid channels can be distributed circumferentially in respect to the axis. In this manner, a flow cross section for the raw fluid can be enlarged. Moreover, a more uniform fluid flow can be enabled in this way.

In a further advantageous embodiment, the intermediate cover, at its radially outer circumferential side in respect to the axis, can comprise at least one circumferentially continuous seal. In this way, the intermediate cover can be sealed radially outwardly against at least one corresponding housing part of the filter housing and/or a part of the at least one centrifuge separator.

Advantageously, with the at least one seal the intermediate cover can be sealed against a radially inner circumferential wall of a housing cup.

Alternatively or additionally, the intermediate cover can be sealed with the at least one seal against a holding part of the at least one centrifuge separator.

Advantageously, the at least one seal can be designed such that it can seal against a radially inner circumferential wall of a housing cup as well as against a holding part of the at least one centrifuge separator.

Advantageously, at least one seal can be designed such that it acts sealingly in axial direction as well as in radial direction in respect to the axis.

Advantageously, the at least one seal can be embodied as a so-called half-moon seal. The half-moon seal has an approximately half-moon-shaped profile. With a half-moon seal, a plurality of sealing locations can be sealed simultaneously radially and axially.

As an alternative or additionally, at least one seal can be designed such that it acts sealingly exclusively in radial direction or exclusively in axial direction.

In a further advantageous embodiment, the intermediate cover can comprise at its radially outer circumferential side in respect to the axis two seals, each circumferentially continuous, which are spaced apart from each other axially, wherein axially between the seals at least one outlet opening of the at least one clean fluid channel extends away from the circumferential side of the intermediate cover. In this way, the at least one outlet opening can be sealed against the centrifuge receiving space as well as against the filter receiving space. In addition, the raw fluid side can be sealed against the clean fluid side. Also, sealing against the environment can be realized.

In a further advantageous embodiment, the intermediate cover can comprise at its centrifuge-side end face at least one centrifuge centering device for securing on at least one part of the at least one centrifuge separator and/or at its filter-side end face at least one filter-centering device for securing on the at least one filter insert. With the centrifuge centering device, the at least one centrifuge separator and the intermediate cover can be centered relative to each other and/or held at a distance. In addition, the centrifuge centering device can also comprise a holding function so that the participating components can be fixed on each other. Correspondingly, the at least one filter centering device can serve for centering and/or spacing apart the at least one filter insert in respect to the intermediate cover. In addition, the filter centering device can also comprise a holding function for fixation of the at least one filter insert at the intermediate cover.

Advantageously, the at least one centrifuge centering device and/or the at least one filter centering device can be embodied as a quick-connect device, in particular locking connection, snap-on connection, clip connection, plug-in connection or the like. In this manner, the centering devices can be easily and quickly connected and, as needed, released again.

In a further advantageous embodiment, the intermediate cover can be designed cup-shaped at its centrifuge-side end face and/or at its filter-side end face. In this way, the intermediate cover at the corresponding end face can serve in addition for receiving a corresponding component, in particular a holding part of the at least one centrifuge separator or of an end body of the at least one filter insert. The circumferential wall of the cup-shaped end face of the intermediate cover can surround the corresponding participating components of the at least one centrifuge separator and/or of the at least one filter insert. As a whole, the mechanical stability of the intermediate cover can be increased.

The object is further solved for the filter insert in accordance with the invention in that the filter insert at an axial end face, that is axial in respect to the axis and at which the connecting device is located, comprises at least one outlet opening for purified clean fluid which can be brought into correspondence with at least one inlet opening of at least one clean fluid channel of the intermediate cover, wherein the at least one outlet opening at least partially forms the connecting device.

According to the invention, outlet opening of the filter insert for clean fluid is arranged at the side which is facing the centrifuge separator. In this way, corresponding clean fluid channels in the filter housing can be dispensed with at the end face axially facing away from the centrifuge separator. The fluid outlet of the filter housing can thus be realized between the filter receiving space and the centrifuge receiving space approximately at the level of the intermediate cover. In this way, the clean fluid channels in the filter housing can be designed to be shorter as a whole.

Advantageously, the filter insert at the end face which is facing away axially from the outlet opening of the filter insert in respect to the axis can have a receptacle for a bypass valve. Through the bypass valve, the raw fluid can bypass the filter medium of the filter insert and can be guided directly to the clean fluid side. For this purpose, the bypass valve can be opened starting at a predeterminable differential pressure. This differential pressure can be reached in particular in case the filter medium is blocked or the passage is impaired in another way. In this way, a flow passage through the filter can always be realized. Thus, the operational safety of a machine in whose fluid circuit the filter is contained can be ensured.

Advantageously, the bypass valve can be fastened on the part of the filter housing. Upon installation of the filter insert, the bypass valve can be inserted automatically into the corresponding receptacle.

Advantageously, the connecting device of the filter insert can comprise at least a part of a centering device. With the centering device, the filter insert can be centered in respect to the intermediate cover.

Advantageously, a radial dimension of the filter insert on its side which is facing the intermediate cover, in particular the radial dimension of an end body, can be significantly smaller than the radial inner dimension of a cup-shaped part of the intermediate cover which can accommodate at least partially the filter insert. In this way, a fluid passage can be realized between the radially outer circumferential side of the filter insert and the radial inner circumferential side of the cup-shaped part of the intermediate cover.

Advantageously, at least one spacer can be realized between the intermediate cover and the end face of the filter insert facing it. In this manner, the end face of the filter insert, in particular the end disc, can be held at a distance from the end face of the intermediate cover. In this way, an end face-side fluid passage can be realized between the filter insert and the end face of the intermediate cover.

Advantageously, at least one spacer can be realized at the end face of the intermediate cover. In this manner, a conventional end disc can be used on the part of the filter insert.

As an alternative or in addition, at least one spacer can be realized at an end body of the filter insert.

In an advantageous embodiment, the filter insert can comprise at least one part of a sealing device with which the at least one outlet opening can be sealed against the intermediate cover. The sealing device can be advantageously a seal or sealing surface which is circumferentially continuous in respect to the axis. By means of the sealing device, the raw fluid side of the filter insert can be separated from the clean fluid side.

In a further advantageous embodiment, the filter insert can comprise at the end face which is axially facing away from the connecting device at least one part of an actuation device for a fluid drain of the filter housing. By means of the fluid drain, fluid contained in the filter housing can be drained upon removal of the filter insert. It can be prevented in this way that fluid accidentally can flow into the environment upon exchange of the filter insert. When removing the filter insert, the fluid drain can be automatically released by the actuation device so that the fluid can drain off. In reverse, upon installation of the filter insert, the fluid drain can be automatically closed by means of the actuation device.

Advantageously, the filter insert may comprise the intermediate cover, in particular can be connected thereto detachably or non-detachably; for example, the parts can be connected to each other frictionally by a plug-in action, by a locking connection and/or by an adhesive connection. In this way, the exchange of the filter element can be simplified. Such a simplification can also be achieved by a delivery unit according to the invention comprising a filter insert according to the invention and an intermediate cover according to the invention for installation in a filter housing for service purposes.

Advantageously, the axial length of the filter insert can be designed such that the fluid drain is actuated to be closed by the actuation device when the filter insert is installed correctly.

Moreover, the invention concerns a filter device comprising a filter housing as well as an exchangeable filter insert according to the invention and an intermediate cover according to the invention as well as the use of the filter insert and/or of the intermediate cover in a filter housing.

Advantageously, the filter comprises a filter housing with a housing cup which is closed off by a removable housing cover. The housing cup as well as the housing cover are preferably designed cup-shaped. The housing cover is preferably connected by means of a screw connection by a screwing action in respect to an imaginary axis. Preferably, the housing cover comprises for this purpose preferably an outer thread and the housing cup a corresponding inner thread.

In the filter housing, preferably a filter receiving space for a filter insert and a centrifuge receiving space for a centrifuge separator are provided. The filter receiving space and the centrifuge receiving space are, for example, coaxial and circular cylindrical, respectively. The filter receiving space and the centrifuge receiving space are preferably separated from each other by an intermediate cover according to the invention. In the normal installation position of the filter, the filter receiving space is arranged preferably at the bottom of the housing cup. The centrifuge receiving space is located moreover preferably spatially above the filter receiving space and further preferred partially in the housing cover and with the other part within the housing cup. The intermediate cover is screwed in, for example, below the free rim of the housing cover into the inner thread of the housing cup. The intermediate cover is located thus axially between the filter receiving space and the centrifuge receiving space.

The filter housing comprises a fluid inlet for the fluid to be purified. The fluid inlet extends preferably through the bottom of the housing cup into the filter receiving space.

In other respects, the features and advantages which have been discussed in connection with the intermediate cover according to the invention and the filter insert according to the invention and their respective advantageous embodiments apply among each other correspondingly and vice versa. The individual features and advantages can be combined of course among each other wherein further advantageous effects may result which go beyond the sum of the individual effects.

BRIEF DESCRIPTION OF THE DRAWINGS

Further advantages, features, and details of the invention result from the following description in which an embodiment of the invention will be explained in more detail with the aid of the drawing. A person of skill in the art will expediently consider the features disclosed in combination in the drawing, the description, and the claims also individually and combine them to expedient further combinations.

In the Figures, same components are provided with same reference characters.

DESCRIPTION OF PREFERRED EMBODIMENTS

In FIGS. 1 to 7, a filter 10 for purifying liquid fluid is illustrated in various sections and detail views.

Particles can be removed from liquid fluids, for example, motor oil, fuel, water, urea-water solution, hydraulic liquid or the like by means of the filter 10. For this purpose, the filter 10 can be arranged in a corresponding liquid line, for example, of an internal combustion engine.

When in the following "raw fluid" is mentioned, this means in the context of the invention fluid to be purified by the filter 10. "Clean fluid" means fluid that has been purified by the filter 10. The raw fluid side is therefore the side at which the fluid to be purified is located. The clean fluid side is the side where the purified fluid is located.

The filter 10 comprises a filter housing 12 with a housing cup 14 which is closed off by a removable housing cover 16. The housing cup 14 as well as the housing cover 16 are embodied cup-shaped. The housing cover 16 is connected by a screw connection by a screwing action in respect to an imaginary axis 18. The housing cover 16 comprises for this purpose an outer thread and the housing cup 14 a corresponding inner thread.

When in following "axial", "radial", "circumferential", "coaxial" or the like is mentioned, this relates to the axis 18, as long as nothing to the contrary is mentioned.

Figure 1:
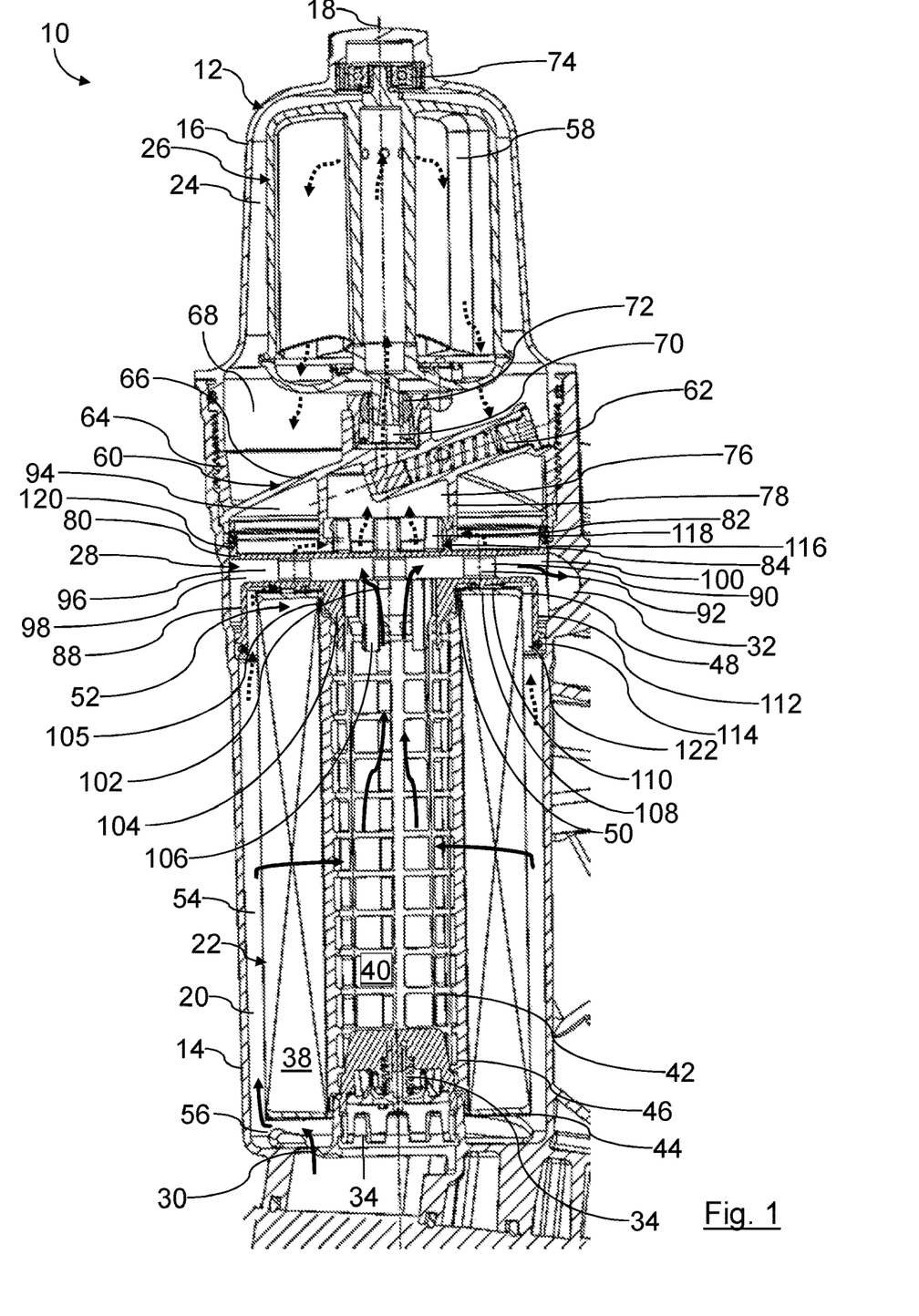
FIG. 1 shows a longitudinal section of a filter for purifying liquid, with a filter insert and a centrifuge separator, between which an intermediate cover is arranged.
Figure 2:
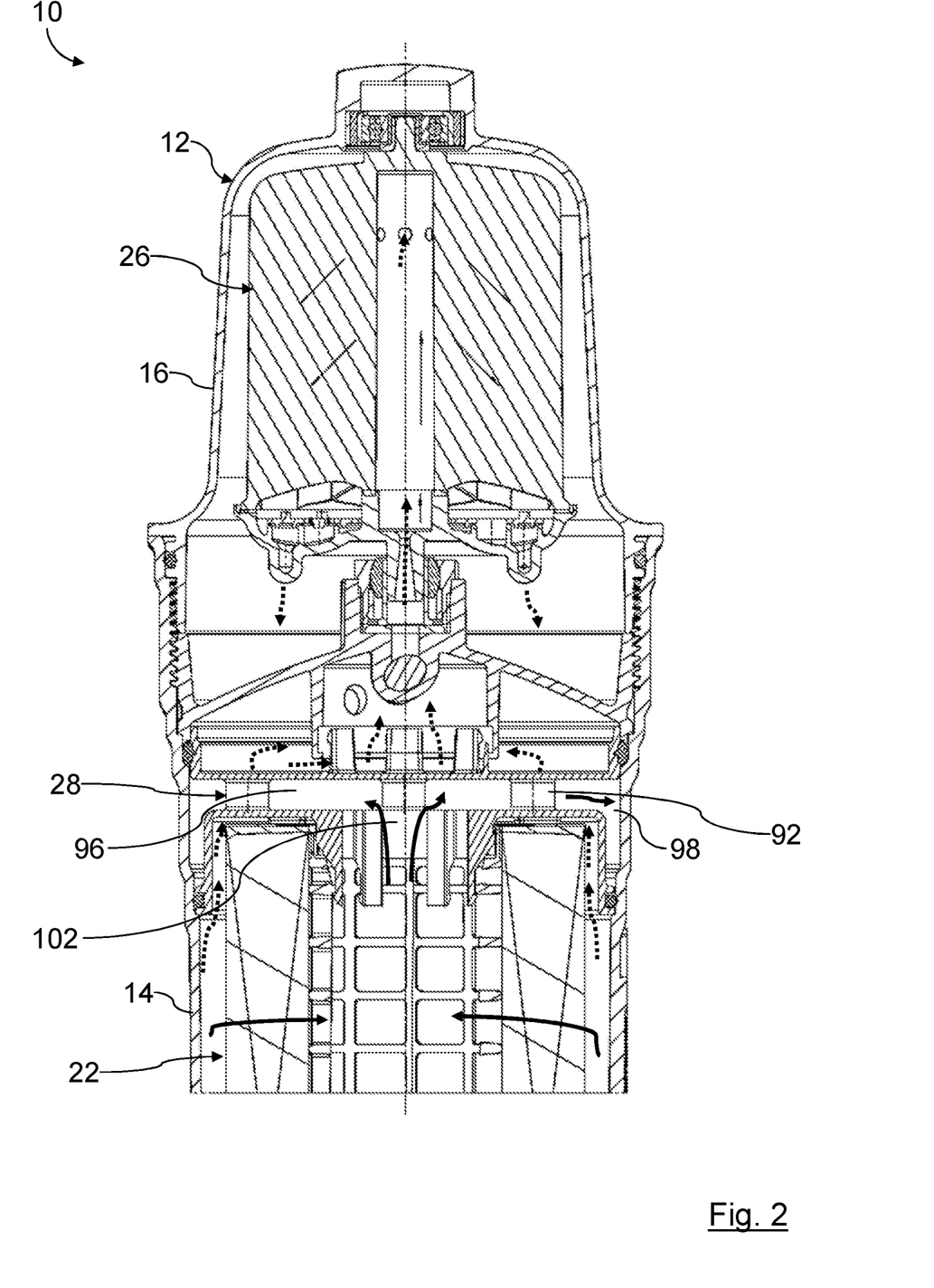
FIG. 2 shows a detail of a longitudinal section of the filter of FIG. 1 along a different section plane.
Figure 3:
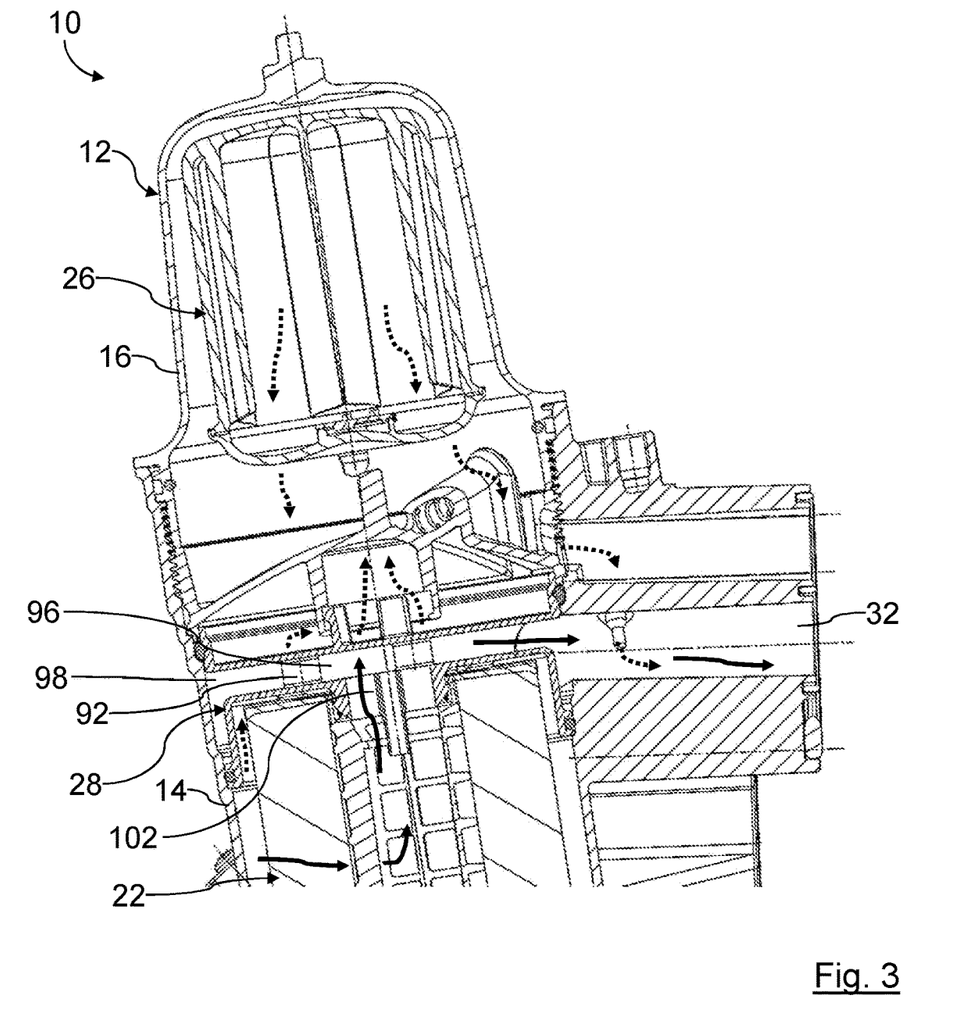
FIG. 3 shows a further detail of a longitudinal section of the filter of the FIGS. 1 and 2 along a further section plane.

In the filter housing 12, a filter receiving space 20 for a filter insert 22 and a centrifuge receiving space 24 for a centrifuge separator 26 are provided. In an exemplary fashion, the filter receiving space 20 and the centrifuge receiving space 24 are coaxial and circular cylindrical, respectively. The filter receiving space 20 and the centrifuge receiving space 24 are separated from each other by an intermediate cover 28. In the normal installation position of the filter 10, as it is illustrated in FIG. 1, the filter receiving space 20 is arranged at the bottom in the housing cup 14. The centrifuge receiving space 24 is located spatially above the filter receiving space 20, partially in the housing cover 16. The intermediate cover 28 is screwed in, for example, below the free rim of the housing cover 16 into the inner thread of the housing cup 14. The intermediate cover 28 is located thus axially between the filter receiving space 20 and the centrifuge receiving space 24.

The filter housing 12 comprises a fluid inlet 30 for fluid to be purified. The fluid inlet 30 extends through the bottom of the housing cup 14 into the filter receiving space 20.

The fluid outlet 32 for purified fluid extends through the circumferential side of the housing cup 14. The fluid outlet 32 is located approximately at the level of the intermediate cover 28 in a region between the filter receiving space 20 and the centrifuge receiving space 24.

The opening of the housing cup 14 which can be closed off by the housing cover 16 serves as an installation opening for the filter insert 22, the intermediate cover 28, and a holding unit 60 of the centrifuge separator 26.

Moreover, a bypass channel 34 in which a bypass valve 36 is arranged extends centrally through the bottom of the housing cup 14. The bypass valve 36 extends axially into the filter receiving space 20. The bypass channel 34 connects directly the raw fluid side of the filter insert 22 with its clean fluid side. The bypass valve 36 releases the bypass channel 34 as soon as a corresponding pressure difference between the input side and the output side of the bypass valve 36 is present. This can be the case, for example, when a fluid passage through the filter insert 22 is blocked. In this way, a fluid flow through the filter 10 can still be ensured.

The filter insert 22 is, for example, a so-called round filter element. The filter insert 22 comprises a filter medium 38, for example, filter nonwoven or filter paper. The filter medium 38 surrounds the axis 18 circumferentially continuously and delimits circumferentially an insert interior 40 of the filter insert 22.

In the insert interior 40, a grid-type support pipe 42 is arranged which extends between the axial end faces of the filter insert 22. The support pipe 42 is open at both end faces. The circumferential wall of the support pipe 42 is permeable for liquid.

At the end face of the filter insert 22 which is facing the bottom of the housing cup 14, an inlet-side end disc 44 is arranged which is connected seal-tightly with the filter medium 38. The inlet-side end disc 44 comprises a coaxial opening through which the bypass valve 36 is extending. The opening and the region of the support pipe 42 thereat form a receptacle 46 for the bypass valve 36.

At the centrifuge-side end face which is facing the housing cover 16, a centrifuge-side end disc 48 is connected seal-tightly to the filter medium 38. The centrifuge-side end disc 48 comprises a central outlet opening 50 for purified fluid. The outlet opening 50 and the region of the support pipe 42 thereat belong to a connecting device 52 with which the filter insert 22 is connected to the intermediate cover 28.

The outer diameter of the filter insert 22, in particular the outer diameter of the end discs 44 and 48, are significantly smaller than an inner diameter of the housing cup 14. In this way, between the radially outer circumferential side of the filter insert 22 and the radially inner circumferential side of the housing cup 14, the fluid-conducting annular space 54 is formed at the raw fluid side of the filter insert 22.

Moreover, the inlet-side end disc 44 is held at an axial distance to the bottom of the housing cup 14 so that an end face inlet space 56 for fluid to be purified is produced between the inlet-side end disc 44 and the bottom of the housing cup 14. The fluid inlet 30 opens into the inlet space 56.

The centrifuge separator 26 comprises a holding unit 60, a rotor 58, and a bypass valve 62.

The holding unit 60 comprises a circular cylindrical, coaxial fastening section 64 with an outer thread and a central section 66. The central section 66 is located radially inside the fastening section 64 and is connected as one piece together therewith.

With the outer thread of the fastening section 64, the holding unit 60 is screwed into the inner thread in the region of the installation opening of the housing cup 14.

The central section 66 forms a separation wall between a centrifuge outlet space 68 and the intermediate cover 28. The central section 66 is convexly curved when viewed from the housing cover 16. The central section 66 comprises a coaxial centrifuge inlet 70 for fluid to be purified.

At the side which is facing away from the intermediate cover 28, a bottom support 72 for the rotor 58 adjoins the centrifuge inlet 70. A corresponding upper support 74 for the rotor 58 is arranged at the top in the bottom of the housing cover 16. The rotor 58 is supported, rotatable about axis 18, in the bottom support 72 and the upper support 74.

Moreover, the bypass valve 62 is arranged in the central section 66. By means of the bypass valve 62, a direct connection between an intermediate space 76 at the inlet side of the centrifuge separator 26 and the centrifuge outlet space 68 can be produced upon surpassing a predetermined pressure difference. In this way, the fluid can bypass the centrifuge separator 26 in case a fluid passage through the centrifuge separator 26 is blocked, for example, due to soiling.

At the side of the central section 66 which is facing axially away from the rotor 58, a coaxial holding cylinder 78 is arranged. The holding cylinder 78 is formed as one piece together with the central section 66. The holding cylinder 78 surrounds the centrifuge inlet 70 and the intermediate space 76 continuously in circumferential direction. The holding cylinder 78 extends axially in the direction toward the intermediate cover 28 and ends shortly before a centrifuge-side separation section 80 of the intermediate cover 28. Due to the distance between the free rim of the holding cylinder 78 and the centrifuge-side separation section 80, a circumferential passage for the fluid is realized.

At the radial inner circumferential side, the holding cylinder 78 comprises a circumferential locking groove in which corresponding locking hooks 82 of a holding device 84 of the intermediate cover 28 can lock.

The intermediate cover 28 comprises the centrifuge-side separation section 80, formed as a wall (see FIG. 6. wall pointed to by 80), arranged at the end face which is axially facing the centrifuge separator 26 and a filter-side separation section 88 at the side which is axially facing the filter insert 22. The separation sections 80 and 88 are designed each as a disc section. The separation sections 80 and 88 extend, for example, axially spaced apart and parallel to each other.

The separation sections 80 and 88 are connected as one piece with each other by means of a plurality of hollow cylinder sections 90. The imaginary axes of the cylinder sections 90 extend in an exemplary fashion parallel to the axis 18. The interiors of the cylinder sections 90 form a raw fluid channel 92, respectively. The cylinder sections 90 and thus the raw fluid channels 92 are arranged circumferentially distributed. The raw fluid channels 92 connect the raw fluid side of the filter insert 22 with a centrifuge inlet space 94.

The centrifuge inlet space 94 surrounds circumferentially the holding cylinder 78 of the holding unit 60 of the centrifuge separator 26. The centrifuge inlet space 94 is connected by means of the passage gap between the holding cylinder 78 and the centrifuge-side separation section 80 with the intermediate space 76 and through the latter with the centrifuge inlet 70.

An intermediate space between the separation sections 80 and 88 forms as a whole a clean fluid channel 96. The clean fluid channel 96 is open in radially outward direction circumferentially continuously and forms thereat an outlet opening 98. The cylinder sections 90 with the raw fluid channels 92 pass through the intermediate space which forms the clean fluid channel 96. In this context, the raw fluid channels 92 are separated with the walls of the cylinder sections 90 from the clean fluid channel 96.

When the intermediate cover 28 is mounted, the outlet opening 98 corresponds with an annular outlet space 100. Due to the circumferentially extending continuously open outlet opening 98, the connection to the annular outlet space 100 is produced independent of the rotational orientation of the filter insert 22 in respect to the filter housing 12. The annular outlet space 100 surrounds the intermediate cover 28 circumferentially and is connected to the fluid outlet 32. In this manner, the outlet opening 98 corresponds with the fluid outlet 32.

The filter-side separation section 88 comprises moreover a central inlet opening 102 for purified fluid. The inlet opening 102 opens into the clean fluid channel 96.

At the side of the filter-side separation section 88 which is axially facing away from the centrifuge-side separation section 80, a filter centering device 104 in the form of a hollow cylinder extends in axial direction. The filter centering device 104 is circumferentially closed at its side which is facing the filter-side separation section 88.

The radially outer circumferential side of the filter centering device 104 comprises a circumferentially continuous sealing device 105 with which a sealing action against a radially inner circumferential side of the centrifuge-side end disc 48 is provided. Thus, the outlet opening 50 is sealed against the intermediate cover 28. The sealing device 105 separates the raw fluid side from the clean fluid side.

At the side which is axially facing away from the filter-side separating section 88, the filter centering device 104 comprises a plurality of circumferentially distributed locking arms 106. The locking arms 106 can lock at the support pipe 42 of the filter insert 22 and therefore center the latter relative to the intermediate cover 28. In this context, the outlet opening 50 and/or the support pipe 42 form a connecting device on the part of the filter insert 22 for connection with the intermediate cover 28.

Moreover, on the end face of the filter-side separation section 88 which is axially facing away from the centrifuge-side separation section 80, a plurality of spacers 108 is arranged circumferentially distributed. The spacers 108 extend in axial direction, respectively. By means of the spacers 108, an axial distance between the filter-side separation section 88 and the centrifuge-side end disc 48 of the filter insert 22 is predetermined. An end face raw fluid space 110 is thus realized between the filter-side separation section 88 and the centrifuge-side end disc 48. The raw fluid channels 92 extend away from the raw fluid space 110.

At the radially outer rim, the filter-side separation section 88 passes into a filter-side cylinder section 112 in a one-piece configuration. The cylinder section 112 surrounds the part of the filter insert 22 which is axially facing the intermediate cover 28. The filter-side separation section 88 with the filter-side cylinder section 112 has overall a cup-shaped.

In the region of the free rim of the filter-associated cylinder section 112, a sealing groove is provided radially outwardly with a circumferentially continuous annular seal 114.

The centrifuge-side separation section 80 comprises the locking hooks 82 at its side which is axially facing away from the filter-side separation section 88. The locking hooks 82 are circumferentially distributed and extend each in axial direction.

The circumferential rim of the centrifuge-side separation section 80 passes into a centrifuge-side cylinder section 116 in a one-piece configuration. The centrifuge-side cylinder section 116 extends in axial direction away from the filter-side separation section 88. As a whole, the centrifuge-side cylinder section 116 and the centrifuge-side separation section 80 have a cup shape.

At the radial outer circumferential side, a circumferentially continuous half-moon seal 118 is arranged at the centrifuge-side cylinder section 116. The half-moon seal 118 has approximately the shape of a half moon in profile.

When the filter 10 is mounted, the annular seal 114 seals in radial direction against the radially inner circumferential side of the circumferential wall of the housing cup 14. The annular seal 114 is located at the side of the fluid outlet 32 which is axially facing away from the installation opening of the housing cup 14. Thus, the annular seal 114 seals the raw fluid side of the filter insert 22 against the clean fluid side.

Figure 4:
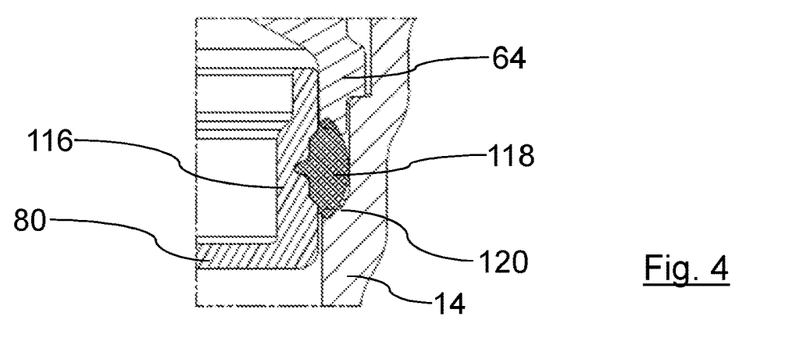
FIG. 4 shows a detail of the longitudinal section of FIG. 3 in the region of a centrifuge-side seal between the intermediate cover and the filter housing.
Figure 5:
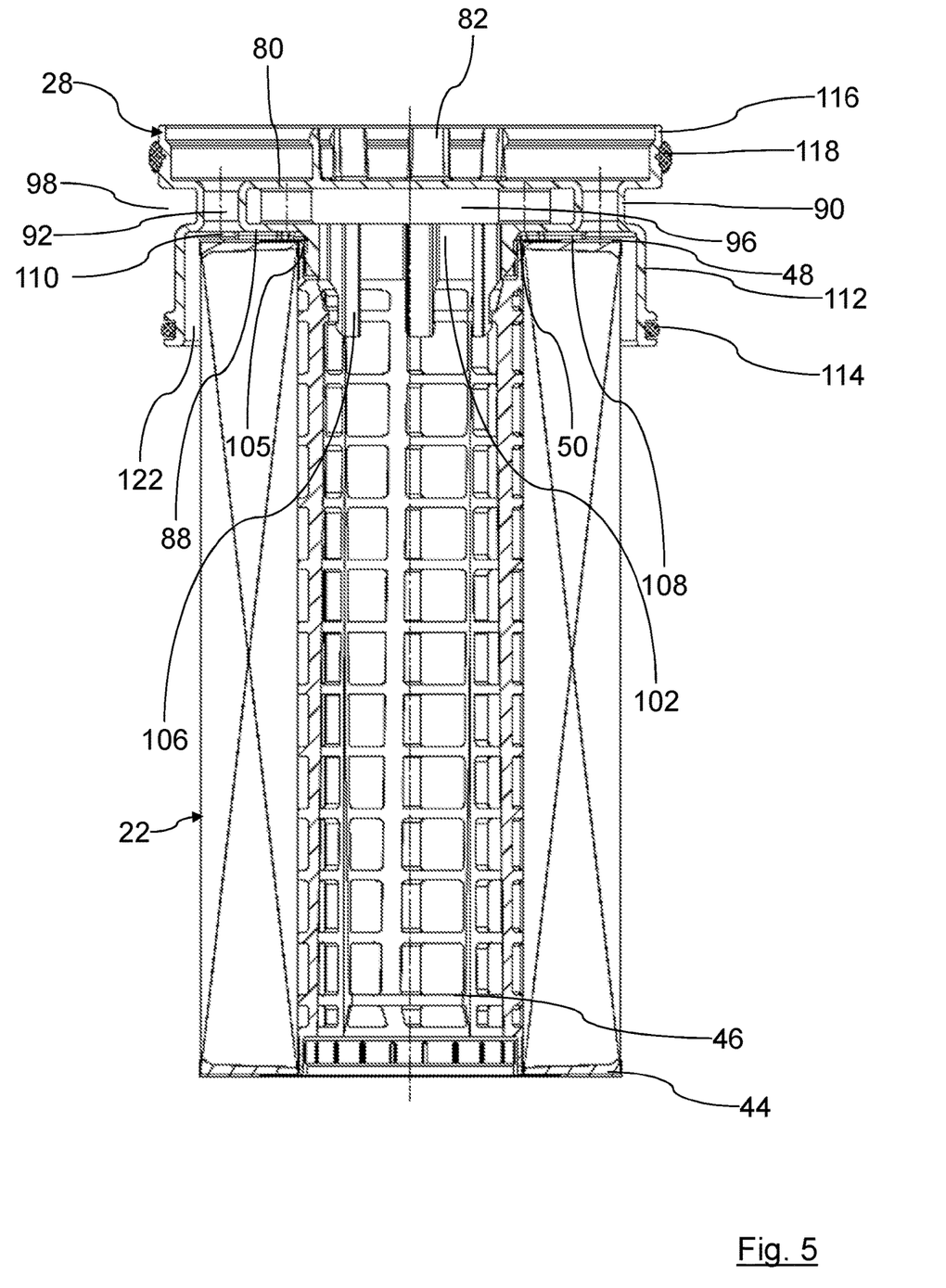
FIG. 5 shows a longitudinal section of the filter insert of the filter of FIGS. 1 to 3 with the intermediate cover.
Figure 6:
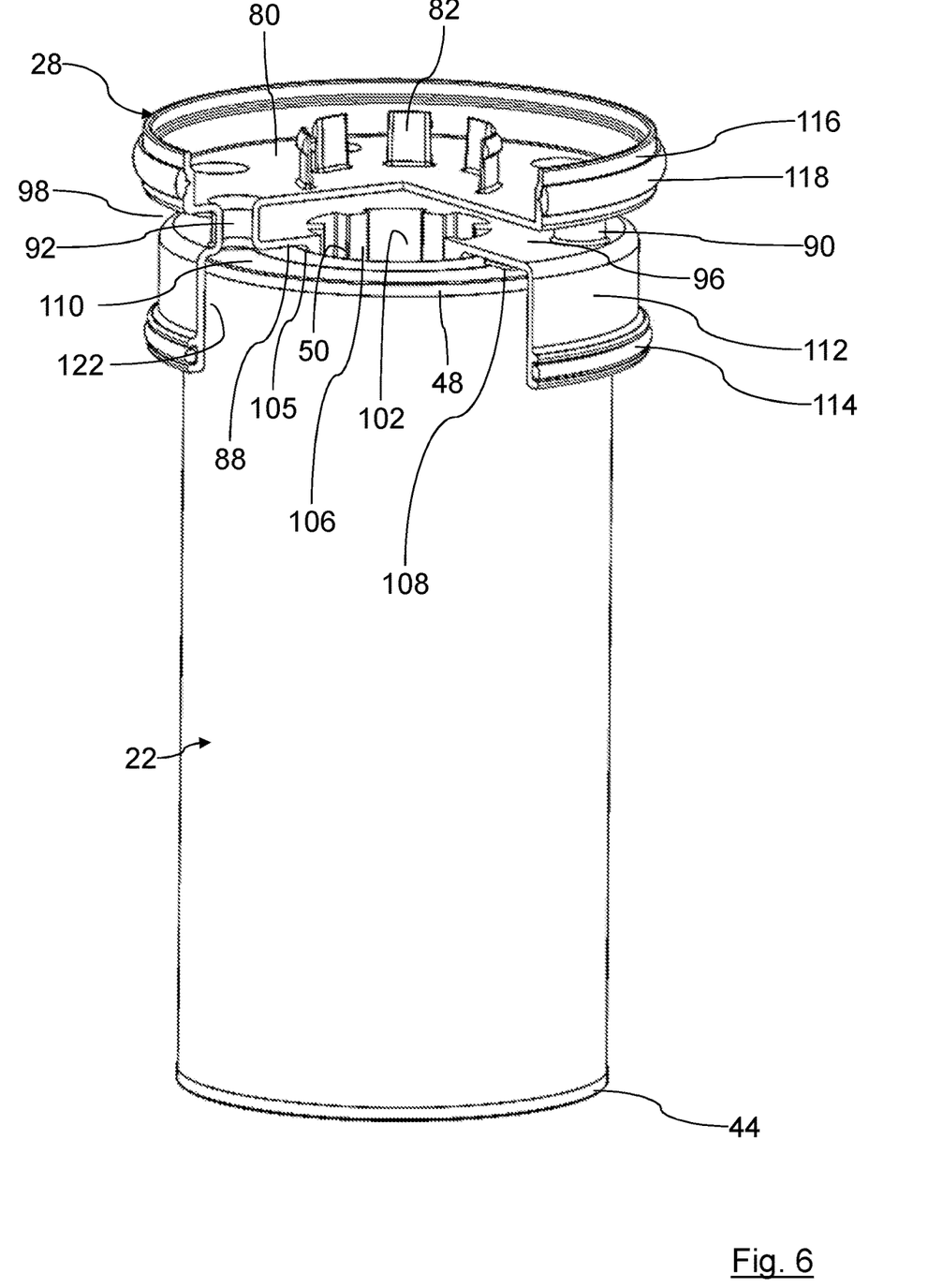
FIG. 6 shows an isometric partial section of the filter insert with the intermediate cover of the filter of FIGS. 1 to 3.

The half-moon seal 118 is illustrated in detail in FIG. 4. When the filter 10 is mounted, the half-moon seal 118 is arranged in a region between the fastening section 64 of the holding unit 60 of the centrifuge separator 26 and the radially inner circumferential side of the housing cup 14. In this context, the half-moon seal 118 acts seal-tightly in radial direction as well as in axial direction. Due to the axial compression between the rim of the fastening section 64 at the axial end face and a step 120 on the part of the housing cup 14, on the one hand, the axial sealing action is generated. Due to the axial compression, the half-moon seal 118 yields in radial direction so that the radial sealing action is improved. In this way, a plurality of sealing locations can be sealed radially and axially by means of the half-moon seal 118.

In operation of the filter 10, the raw fluid flows through the fluid inlet 30 into the annular space 54. The flow of the raw fluid through the filter 10 is indicated by solid arrows. A portion of the raw fluid flows from the annular space 54 in a radial direction from the exterior inwardly into the insert interior 40 through the filter medium 38 and the fluid-permeable support pipe 42. The purified fluid exits from the insert interior 40 through the inlet opening 102 and reaches the clean fluid channel 96. From the clean fluid channel 96, the purified fluid flows into the fluid outlet 32 of the filter housing 12 and exits from the filter 10.

Another portion of the raw fluid is diverted from the annular space 54 to the centrifuge separator 26. This portion of the raw fluid is indicated in FIG. 1 by dotted arrows. The raw fluid flows in this context into an annular gap 122, arranged radially between the radial outer circumferential side of the filter insert 22 and the radial inner circumferential side of the filter-side cylinder section 112. The raw fluid flows from the annular gap 122 into the end face raw fluid space 110. From here, the raw fluid flows through the raw fluid channels 92 into the centrifuge inlet space 94. Through the gap between the hollow cylinder 78 and the centrifuge-side separation section 80, the raw fluid reaches the intermediate space 76. From here, the raw fluid flows through the centrifuge inlet 70 into the rotor 58. With the rotor 58, particles are removed from the raw fluid in a manner generally known, which is not of interest here. The purified fluid sinks, following the force of gravity, in downward direction, exits the rotor housing of the rotor 58 through corresponding openings, not of interest here, and passes into the centrifuge outlet space 68. From the centrifuge outlet space 68, the purified fluid flows into the fluid outlet 32 of the filter housing 12.

Should a differential pressure between the raw fluid side and the clean fluid side of the filter insert 22 surpass a predetermined value, for example, due to loading of the filter insert 22 with dirt, the bypass valve 36 is opened so that the raw fluid can flow directly into the insert interior 40 and from there, as described above, can exit from the filter 10 through the fluid outlet 32.

Should a differential pressure between the intermediate space 76 and the centrifuge outlet space 68 of the centrifuge separator 26 surpass a predetermined value, for example, due to a disturbance, the bypass valve 62 is opened so that the raw fluid can flow directly to the fluid outlet 32 by bypassing the centrifuge separator 26.

Figure 7:
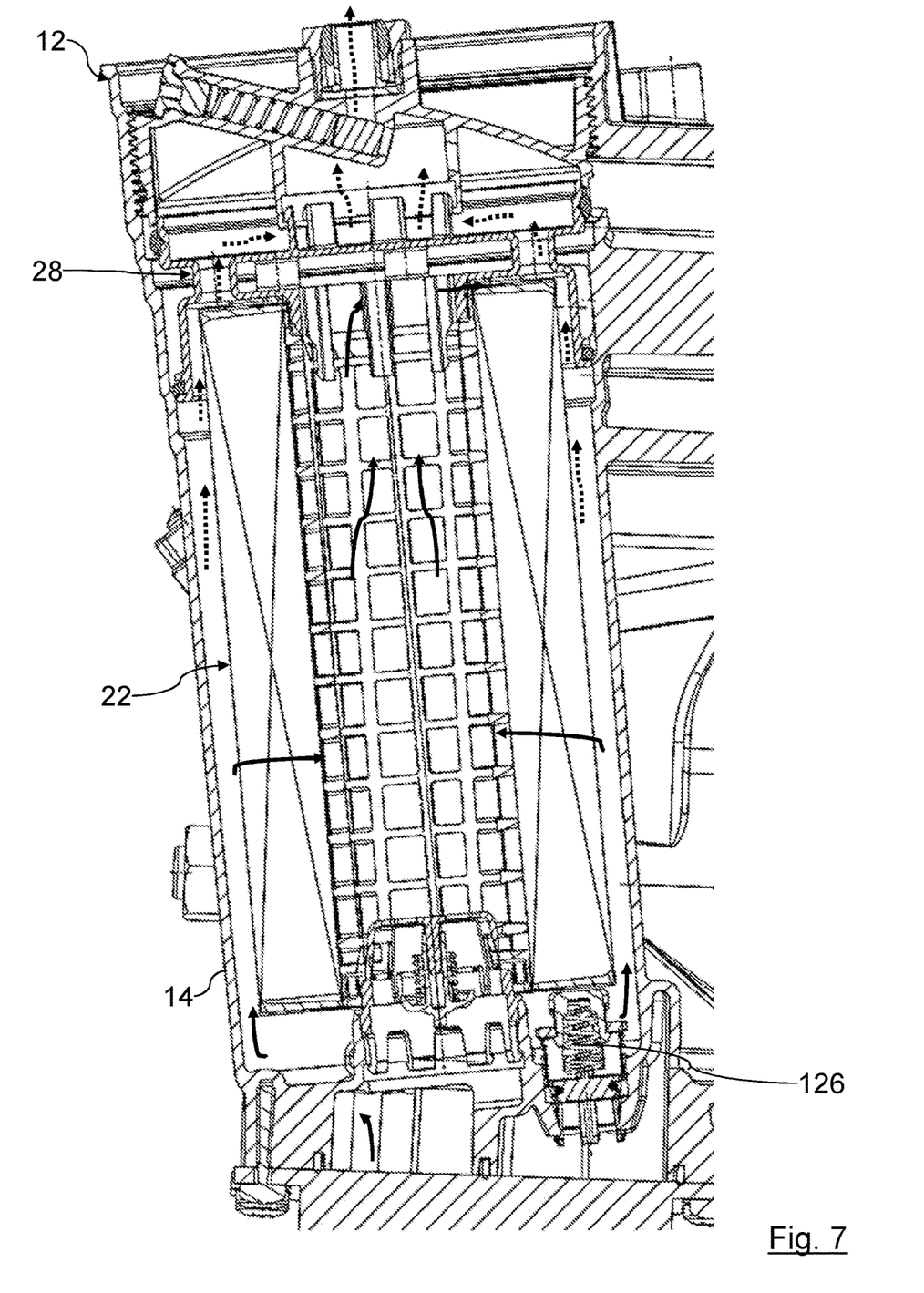
FIG. 7 shows a longitudinal section of the filter of the FIGS. 1 to 3 along a different section plane, wherein here a fluid drain for draining fluid is shown in the bottom of the filter housing.

In FIG. 7, the filter 10 is illustrated in a different longitudinal section in which a fluid drain 126 can be seen in the bottom of the housing cup 14. By means of the fluid drain 126, a passage can be released automatically through which fluid contained in the filter housing 12 can drain upon removing the filter insert 22. The fluid drain 126 can be automatically actuated for closing by the inlet-side end disc 44 in that the latter pushes against a corresponding actuating mechanism of the fluid drain 126 in axial direction toward the bottom of the housing cup 14. The inlet-side end disc 44 is therefore a part of the actuating device for the fluid drain 126. The axial extension of the filter insert 22 is dimensioned such that, when screwing in the holding unit 60, the latter pushes the intermediate cover 28 axially downwardly so that the intermediate cover 28, in turn, pushes the filter insert 22 axially against the actuating mechanism of the fluid drain 126 and the latter is actuated for closing.

What is claimed is:

1. A filter comprising:
    a filter housing comprising a housing cup;
    a filter insert inserted in the housing cup of the filter housing, the filter insert configured to be mounted in the filter housing and removed from the filter housing by a rotary and insertion movement in respect to an axis;
    an intermediate cover inserted in the housing cup of the filter housing for separation of a filter receiving space for the filter insert from a centrifuge receiving space for at least one centrifuge separator and configured to be mounted in the filter housing and removed from the filter housing by a rotary and insertion movement in respect to the axis;
    wherein the intermediate cover comprises at least a portion of at least one clean fluid channel configured to form a fluidic connection between a clean fluid side of the filter insert and at least one fluid outlet of the filter housing for a purified clean fluid, wherein the at least one clean fluid channel comprises at least one inlet opening;
    wherein the filter insert comprises at least one connecting device, arranged at a first axial end face, axial in respect to the axis, of the filter insert, wherein the at least one connecting device of the filter insert is configured to connect to the intermediate cover;
    wherein the filter insert comprises at least one outlet opening for purified clean fluid arranged at the first axial end face of the filter insert, wherein the at least one outlet opening of the filter insert is configured to correspond to the at least one inlet opening of the at least one clean fluid channel of the intermediate cover;
    wherein the at least one outlet opening of the filter insert at least partially forms the at least one connecting device;
    wherein the intermediate cover further comprises:
        a centrifuge section formed as a wall and facing the centrifuge receiving space;
        a filter-side separation section facing the filter receiving space and spaced axially apart from the centrifuge section;
        wherein the at least one clean fluid channel extends radially, is arranged in the intermediate cover and is positioned axially between the filter-side separation section and the centrifuge-side separation section, the at least one clean fluid channel forming a first fluidic connection between a clean fluid side of the filter insert and at least one fluid outlet opening of the filter housing; and
        at least one raw fluid channel extending axially through both the centrifuge section and the filter-side separation section (88), the at least one raw fluid channel configured to form a second fluidic connection between a fluid inlet of the filter housing and the at least one centrifuge separator.

2. A filter for purifying liquid fluids with a filter housing having receiving spaces separated by an intermediate cover, wherein
    the filter housing comprising:
        a housing cup;

the intermediate cover inserted into an interior of the housing cup of the filter housing, the intermediate cover separating an interior of the filter housing into;
a filter receiving space configured to receive a filter insert; and
a centrifuge receiving space configured to receive a centrifuge separator,
wherein the intermediate cover is positioned between the filter receiving space and the centrifuge receiving space;
wherein the intermediate cover is mounted within the filter housing and configured for removal from the interior of the filter housing by a rotary and insertion movement in respect to an axis,
the filter insert inserted in the filter receiving space of the filter housing, the filter insert configured to be mounted in the filter housing and removed from the filter housing by a rotary and insertion movement in respect to the axis;
wherein the intermediate cover comprises:
a filter-side separation section facing the filter receiving space; and
a centrifuge-side separation section facing the centrifuge receiving space;
wherein the intermediate cover further comprises:
at least one clean fluid channel extending through the intermediate cover between the filter-side separation section and the centrifuge-side separation section, the at least one clean fluid channel forming a first fluidic connection between a clean fluid side of the filter insert and at least one fluid outlet opening of the filter housing for a purified clean fluid,
wherein at least a portion of a wall of the at least one clean fluid channel is formed by the intermediate cover;
wherein the intermediate cover further comprises:
a radially outer circumferential side in respect to the axis and two circumferentially continuous seals arranged at the radially outer circumferential side, wherein the two circumferentially continuous seals are axially spaced apart from each other,
wherein axially between the two circumferentially continuous seals at least one outlet opening of the at least one clean fluid channel extends out of the radially outer circumferential side.

3. The filter for purifying liquid fluids according to claim 2, further comprising:
a fluid inlet for a raw fluid to be purified, arranged on the filter housing;
the centrifuge separator inserted in the centrifuge receiving space of the filter housing;
at least one raw fluid channel arranged in the intermediate cover and configured to form a second fluidic connection between the fluid inlet of the filter housing and a centrifuge inlet of the centrifuge separator.

4. The filter for purifying liquid fluids according to claim 3, wherein
a plurality of the at least one raw fluid channel are arranged in the intermediate cover and circumferentially distributed about the axis.

5. The filter for purifying liquid fluids according to claim 3, wherein
the at least one raw fluid channel passes axially in respect to the axis through an intermediate space between the filter-side separation section and the centrifuge-side separation section, wherein the intermediate space forms at least partially the at least one clean fluid channel, wherein the at least one raw fluid channel is surrounded in the intermediate space by at least one channel wall.

6. The filter for purifying liquid fluids according to claim 3, wherein the intermediate cover further comprises:
a filter-side end face facing the filter receiving space; and
a centrifuge-side end face facing the centrifuge receiving space,
wherein the at least one raw fluid channel connects the filter-side end face with the centrifuge-side end face.

7. The filter for purifying liquid fluids according to claim 2, further comprising
an axial end face of the intermediate cover, axial in respect to the axis and facing the at least one filter insert,
wherein at least one outlet opening of the at least one clean fluid channel is arranged at the axial end face,
wherein at least one inlet opening corresponds with at least one outlet opening of the at least one filter insert for the purified clean fluid when the intermediate cover is mounted in the interior of the filter housing.

8. The filter for purifying liquid fluids according to claim 2, wherein
the intermediate cover further comprises:
at least one circumferential side, circumferentially extending in respect to the axis;
wherein at least one outlet opening of the at least one clean fluid channel is arranged at the at least one circumferential side, wherein the at least one outlet opening of the at least one clean fluid channel corresponds with the at least one fluid outlet opening of the filter housing for the purified clean fluid when the intermediate cover is mounted in the interior of the filter housing.

9. The filter for purifying liquid fluids according to claim 8, wherein
the least one outlet opening of the at least one clean fluid channel extends across an entire outer circumference of the intermediate cover.

10. The filter for purifying liquid fluids according to claim 2, wherein
the intermediate cover further comprises:
a radially outer circumferential side in respect to the axis and at least one circumferentially continuous seal arranged at the radially outer circumferential side.

11. The filter for purifying liquid fluids according to claim 2, wherein
the intermediate cover further comprises:
a filter-side end face facing the filter receiving space and
a centrifuge-side end face facing the centrifuge receiving space,
wherein the centrifuge-side end face comprises
at least one centrifuge-centering device for securing on the at least one centrifuge separator or
the filter-side end face comprises at least one filter centering device for securing on the at least one filter insert.

12. The filter for purifying liquid fluids according to claim 2, wherein
the intermediate cover further comprises:
a cup-shaped centrifuge-side end face facing the centrifuge receiving space or
a cup-shaped filter-side end face facing the filter receiving space.

13. The filter for purifying liquid fluids according to claim 2, wherein the filter insert further comprises:

at least one connecting device, arranged at a first axial end face of the filter insert that is axial in respect to the axis, wherein the at least one connecting device is configured to connect to the intermediate cover;

wherein at least one outlet opening for purified clean fluid arranged at the first axial end face of the filter insert, wherein the at least one outlet opening is configured to correspond with at least one inlet opening of the at least one clean fluid channel of the intermediate cover, wherein the at least one outlet opening at least partially forms the at least one connecting device.

14. The filter for purifying liquid fluids according to claim 13, wherein the filter insert further comprises at least one part of a sealing device configured to seal the at least one outlet opening against the intermediate cover.

15. The filter for purifying liquid fluids according to claim 14, wherein the filter insert further comprises a second axial end face, facing axially away from the at least one connecting device, wherein the second axial end face comprises at least one part of an actuation device configured to actuate a fluid drain of the filter housing.

16. The filter for purifying liquid fluids according to claim 14, wherein the at least one clean fluid channel of the intermediate cover forms at least partially a fluidic connection between a clean fluid side of the at least one filter insert and the at least one fluid outlet opening of the filter housing for a purified clean fluid.

* * * * *